(12) United States Patent
Miyahara

(10) Patent No.: US 9,253,400 B2
(45) Date of Patent: Feb. 2, 2016

(54) IMAGE CAPTURE APPARATUS AND CONTROL METHOD THEREOF

(71) Applicant: CANON KABUSHIKI KAISHA, Tokyo (JP)

(72) Inventor: Shimpei Miyahara, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/197,779

(22) Filed: Mar. 5, 2014

(65) Prior Publication Data

US 2014/0267807 A1 Sep. 18, 2014

(30) Foreign Application Priority Data

Mar. 18, 2013 (JP) ................. 2013-055419

(51) Int. Cl.
*H04N 5/228* (2006.01)
*H04N 5/232* (2006.01)

(52) U.S. Cl.
CPC ....... *H04N 5/23251* (2013.01); *H04N 5/23245* (2013.01); *H04N 5/23258* (2013.01); *H04N 5/23274* (2013.01); *H04N 5/23287* (2013.01)

(58) Field of Classification Search
CPC .......... H04N 5/23248; H04N 5/23251; H04N 5/23254; H04N 5/23258; H04N 5/23264; H04N 5/23267; H04N 5/2327; H04N 5/23274; H04N 5/2328; H04N 5/23287
USPC ........ 348/208.5, 207.2, 208.2, 350, 345, 349, 348/246, 208.4
See application file for complete search history.

(56) References Cited

U.S. PATENT DOCUMENTS

| | | | |
|---|---|---|---|
| 7,791,644 B2* | 9/2010 | Ebato | H04N 5/23248 348/208.2 |
| 2005/0057662 A1* | 3/2005 | Washisu | 348/208.99 |
| 2006/0055787 A1* | 3/2006 | Hirota | G03B 5/00 348/208.5 |
| 2007/0183765 A1* | 8/2007 | Imamura | 396/55 |

(Continued)

FOREIGN PATENT DOCUMENTS

| | | |
|---|---|---|
| JP | 2803072 A | 9/1998 |
| JP | 2010-004370 A | 1/2010 |

OTHER PUBLICATIONS

The above patent documents were cited in a British Search Report issued on Sep. 25, 2014, which is enclosed, that issued in the corresponding British Patent Application No. 1404826.8.

*Primary Examiner* — Sinh Tran
*Assistant Examiner* — Xi Wang
(74) *Attorney, Agent, or Firm* — Cowan, Liebowitz & Latman, P.C.

(57) ABSTRACT

An image capture apparatus includes an image pickup device, a first image stabilization unit which optically corrects an image blur by driving part of the optical system, a second image stabilization unit which electronically corrects the image blur by controlling the image readout position of the image pickup device, a shake detection unit which detects a shake of the image capture apparatus, a correction amount calculation unit which calculates an image stabilization amount based on the detected shake signal, and a division unit which divides a first image stabilization amount of a predetermined frequency band into a second image stabilization amount for correcting the image blur by the first image stabilization unit and a third image stabilization amount for correcting the image blur by the second image stabilization unit.

12 Claims, 9 Drawing Sheets

(56) References Cited

U.S. PATENT DOCUMENTS

| | | | |
|---|---|---|---|
| 2008/0239084 A1* | 10/2008 | Endo | G03B 7/097 348/208.4 |
| 2010/0013939 A1* | 1/2010 | Ohno | H04N 5/2251 348/208.5 |
| 2010/0123787 A1* | 5/2010 | Yamanaka | 348/208.4 |
| 2011/0134259 A1* | 6/2011 | Kim | H04N 5/23248 348/208.4 |
| 2014/0002679 A1 | 1/2014 | Ikeda | |
| 2014/0267807 A1 | 9/2014 | Miyahara | |

\* cited by examiner

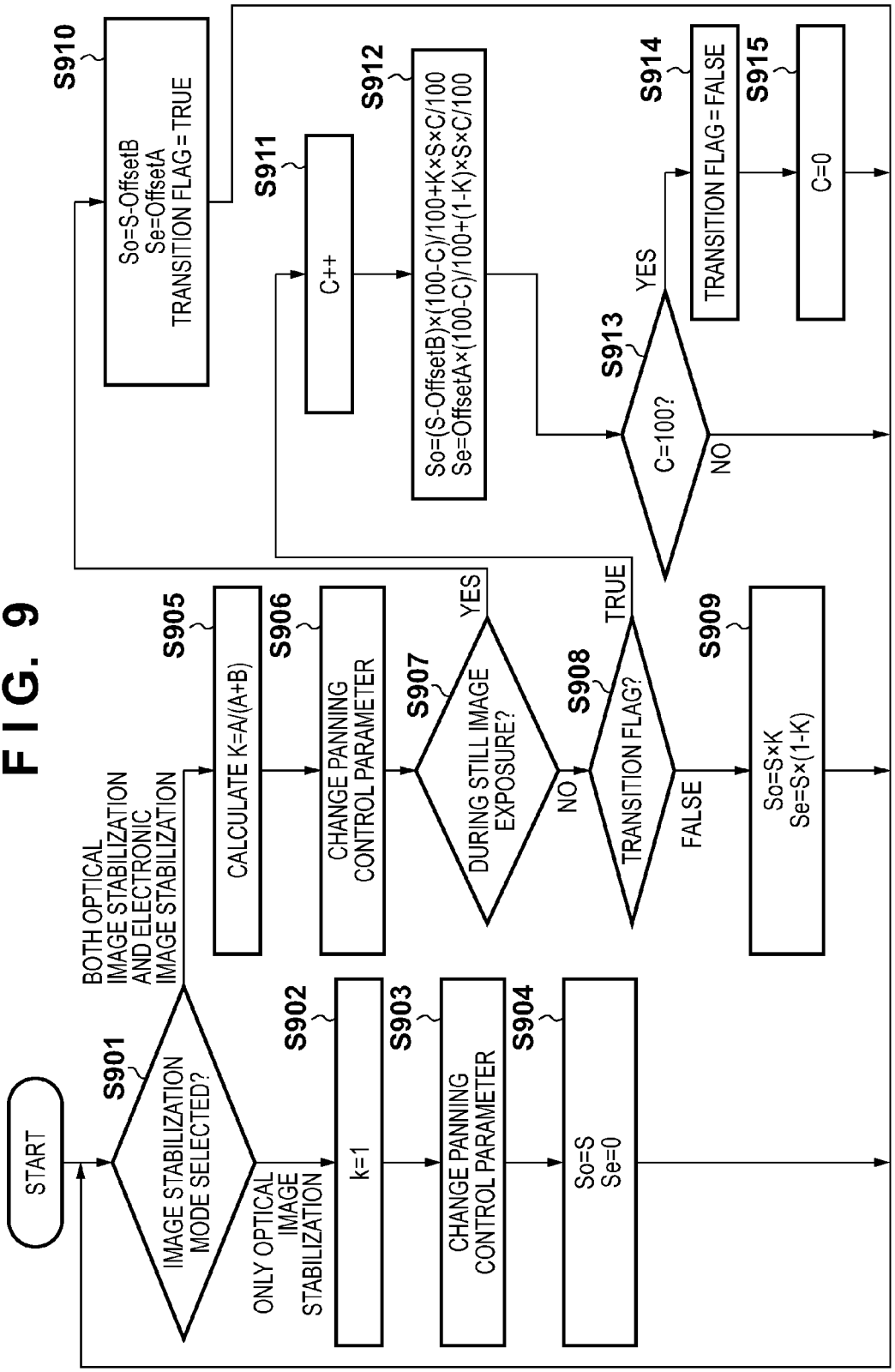

IMAGE CAPTURE APPARATUS AND CONTROL METHOD THEREOF

BACKGROUND OF THE INVENTION

1. Field of the Invention

The present invention relates to an image capture apparatus having an image stabilization function.

2. Description of the Related Art

There is known an image capture apparatus having a shake correction function (optical image stabilization function) of detecting a shake of the image capture apparatus and driving a movable imaging lens to correct an image blur arising from the shake. There is also proposed an image stabilization function (electronic image stabilization function) of controlling an image readout position in moving image shooting in a direction in which the movement of an image caused by a shake is canceled. This function is used in compact, lightweight image capture apparatuses and mobile phones equipped with image capture apparatuses. Image stabilization of this type is called electronic image stabilization.

Recently, there is also known a technique of widening the image stabilization range on the wide-angle side in moving image recording to enhance the image stabilization effect, compared to the conventional one, for a large image blur generated by shooting during walking or the like. At this time, there is also known a technique of obtaining a greater correction effect by using both optical image stabilization and electronic image stabilization so as to cope with a larger image blur.

The following technique is known as the technique using optical image stabilization and electronic image stabilization. For example, in Japanese Patent Laid-Open No. 2010-004370, a detected image blur signal is divided into high and low frequencies by a filter. The high-frequency image blur is corrected by optical image stabilization, and the low-frequency image blur is corrected by electronic image stabilization. This makes control calculation efficient, enhancing the correction effect.

In Japanese Patent No. 2803072, when the image blur amount falls within a range of up to a predetermined value, an image blur is corrected by electronic image stabilization. When the image blur amount is equal to or larger than the predetermined value, an image blur is corrected by optical image stabilization. As a result, the correction range is simply widened, enhancing the correction effect.

Although image stabilization can be implemented during exposure by optical image stabilization, it cannot be performed during exposure by electronic image stabilization because image stabilization is performed by image extraction. In Japanese Patent Laid-Open No. 2010-004370, therefore, only optical image stabilization can be performed during still image exposure. In addition, in Japanese Patent Laid-Open No. 2010-004370, only a high-frequency image blur is subjected to optical image stabilization. As a result, only high-frequency image stabilization can be performed in still image shooting. Further, this technique has problems that a filter for dividing a frequency is necessary, and that the calculation load and program volume increase owing to calculation of an optical image stabilization amount and calculation of an electronic image stabilization amount after division, and the like.

In Japanese Patent No. 2803072, there is a boundary between electronic image stabilization and optical image stabilization. At this boundary, an image is disturbed under the influence of an overshoot upon driving for optical image stabilization, and the like.

SUMMARY OF THE INVENTION

The present invention has been made to solve the above-described problems, and provides an image capture apparatus which improves the image stabilization effect in moving image shooting or in still image shooting during moving image shooting without increasing the calculation load and program volume.

In one aspect, the present invention provides an image capture apparatus comprising: an image pickup device which photo-electrically converts an object image formed by an imaging optical system; a first image stabilization unit configured to optically correct an image blur by driving part of the imaging optical system in a direction in which a blur of the object image is corrected; a second image stabilization unit configured to electronically correct the image blur by controlling an image readout position of the image pickup device in the direction in which the blur of the object image is corrected; a shake detection unit configured to detect a shake of the image capture apparatus to output a shake signal; a correction amount calculation unit configured to calculate an image stabilization amount based on the shake signal detected by the shake detection unit; and a division unit configured to divide a first image stabilization amount of a predetermined frequency band calculated by the correction amount calculation unit into a second image stabilization amount for correcting the image blur by the first image stabilization unit and a third image stabilization amount for correcting the image blur by the second image stabilization unit, wherein while still image exposure is performed upon instructing a still image shooting operation during moving image recording, the first image stabilization unit optically corrects the image blur by using a correction amount obtained by subtracting the third image stabilization amount obtained when the still image shooting operation was instructed, from the first image stabilization amount calculated during a still image exposure period.

In another aspect present invention provides a method of controlling the above image capture apparatus including an image pickup device which photo-electrically converts an object image formed by an imaging optical system, comprising: a first image stabilization step of optically correcting an image blur by driving part of the imaging optical system in a direction in which a blur of the object image is corrected; a second image stabilization step of electronically correcting the image blur by controlling an image readout position of the image pickup device in the direction in which the blur of the object image is corrected; a shake detection step of detecting a shake of the image capture apparatus to output a shake signal; a correction amount calculation step of calculating an image stabilization amount based on the shake signal detected in the shake detection step; and a division step of dividing a first image stabilization amount of a predetermined frequency band calculated in the correction amount calculation step into a second image stabilization amount for correcting the image blur in the first image stabilization step and a third image stabilization amount for correcting the image blur in the second image stabilization step, wherein while still image exposure is performed upon instructing a still image shooting operation during moving image recording, the image blur is optically corrected in the first image stabilization step by using a correction amount obtained by subtracting the third image stabilization amount obtained when the still image shooting operation was instructed, from the first image stabilization amount calculated during a still image exposure period.

Further features of the present invention will become apparent from the following description of embodiments with reference to the attached drawings.

BRIEF DESCRIPTION OF THE DRAWINGS

FIG. 9 is a flowchart showing image stabilization calculation processing.

DESCRIPTION OF THE EMBODIMENTS

Embodiments of the present invention will now be described in detail with reference to the accompanying drawings.

Figure 1:
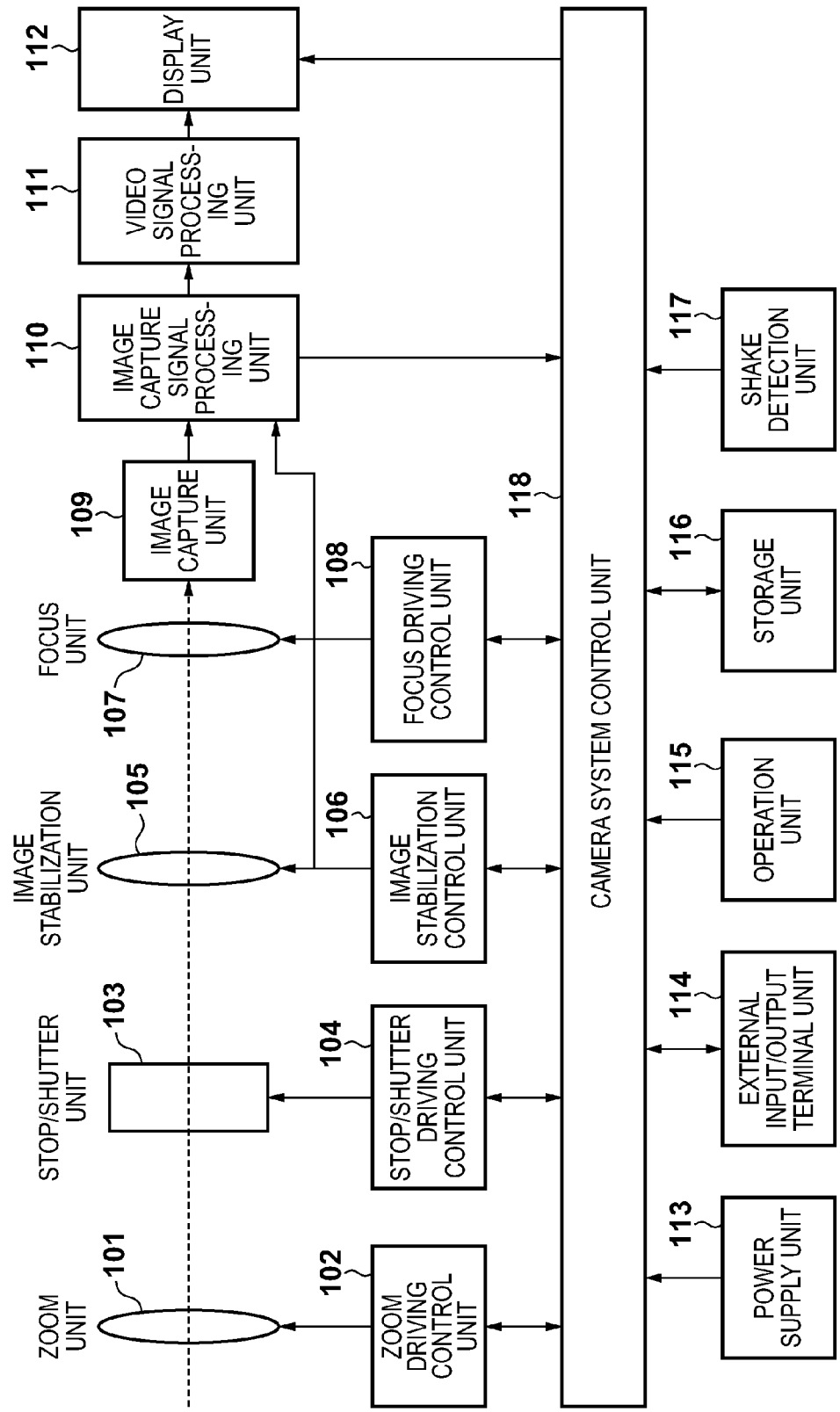
FIG. 1 is a block diagram showing an image capture apparatus according to an embodiment of the present invention.

FIG. 1 is a block diagram showing the arrangement of an image capture apparatus according to the embodiment of the present invention. The image capture apparatus is a digital camera for mainly shooting still images and moving images. However, the image capture apparatus may be not the digital camera, but a digital single-lens reflex camera or digital video camera.

Referring to FIG. 1, a zoom unit 101 is a lens unit including a zoom lens for performing zooming. A zoom driving control unit 102 controls to drive the zoom unit 101. A stop/shutter unit 103 functions as a stop and shutter. A stop/shutter driving control unit 104 controls to drive the stop/shutter unit 103. An image stabilization unit 105 is constructed by a shift lens (image stabilization lens) serving as a correction member. The image stabilization unit 105 deflects the image capture optical axis by moving the image stabilization lens (shift lens) serving as part of an image capture optical system in a direction perpendicular to the optical axis and along an arc to have the rotation center on the optical axis. Accordingly, the image forming position of an image on the image capture plane can be moved. An image stabilization control unit 106 controls to drive the image stabilization unit 105. A focus unit 107 includes a focus lens which forms an object image by adjusting the focus. A focus driving control unit 108 controls to drive the focus unit 107.

An image capture unit 109 photo-electrically converts an optical image having passed through each lens group into an electrical signal. An image capture signal processing unit 110 converts the electrical signal output from the image capture unit 109 into a video signal. Also, the image capture signal processing unit 110 controls the readout position of the video signal in accordance with the correction amount of the image stabilization control unit 106. A video signal processing unit 111 processes the video signal output from the image capture signal processing unit 110 in accordance with an application purpose. If necessary, a display unit 112 displays an image based on the signal output from the video signal processing unit 111. A power supply unit 113 supplies power to the overall system in accordance with an application purpose. An external input/output terminal unit 114 inputs/outputs communication signals and video signals from/to the outside. An operation unit 115 is used to operate the system. A storage unit 116 stores various data such as video information. A shake detection unit 117 detects a shake acting on the camera, and outputs a shake detection signal. A camera system control unit 118 controls the overall system.

Next, the schematic operation of the image capture apparatus having the above-described arrangement will be explained.

The operation unit 115 includes an image stabilization switch capable of selecting image stabilization ON/OFF. When image stabilization ON is selected with the image stabilization switch, the camera system control unit 118 instructs the image stabilization control unit 106 about an image stabilization operation. Upon receiving this instruction, the image stabilization control unit 106 performs the image stabilization operation until an image stabilization OFF instruction is issued. The operation unit 115 also includes an image stabilization mode switch capable of selecting a mode in which image stabilization is performed by only optical image stabilization (first image stabilization), and a mode in which image stabilization is performed by both optical image stabilization and electronic image stabilization (second image stabilization). In the mode in which image stabilization is performed by only optical image stabilization, the readout position of the image capture unit 109 is constant, but the readout range is widened instead so that the image capture apparatus can cope with wide-angle shooting. To the contrary, when the mode in which image stabilization is performed by both optical image stabilization and electronic image stabilization is selected, the readout range (range output as an image) of the image capture unit 109 becomes narrow, but the readout position is changed in accordance with the image stabilization amount instead so that image capture apparatus can cope with a larger image blur.

The operation unit 115 includes a shutter release button configured to sequentially turn on a first switch SW1 and second switch SW2 in accordance with the pressing amount. The switch SW1 is turned on when the shutter release button is pressed almost halfway, and the switch SW2 is turned on when the shutter release button is pressed fully. When the switch SW1 is turned on, the focus driving control unit 108 drives the focus unit 107 to adjust the focus. At the same time, the stop/shutter driving control unit 104 drives the stop/shutter unit 103 to set an appropriate exposure amount. When the switch SW2 is turned on, image data obtained from an optical image exposed to the image capture unit 109 is stored in the storage unit 116.

The operation unit 115 includes a moving image recording switch. Moving image shooting starts when this switch is pressed, and recording ends when this switch is pressed again during recording. When SW1 and SW2 are pressed during moving image shooting, the image capture apparatus can cope with even still image shooting during moving image shooting. The operation unit 115 also includes a playback mode selection switch capable of selecting the playback mode. In the playback mode, the image stabilization operation is stopped.

Further, the operation unit 115 includes a zoom switch used to input a zooming instruction. When the zooming instruction is input from the zoom switch, the zoom driving control unit 102 receives the instruction via the camera system control unit 118, and drives the zoom unit 101 to move the zoom unit

101 to the instructed zoom position. Along with this, the focus driving control unit 108 drives the focus unit 107 to adjust the focus based on image information which has been sent from the image capture unit 109 and processed by the signal processing units 110 and 111.

Figure 2:
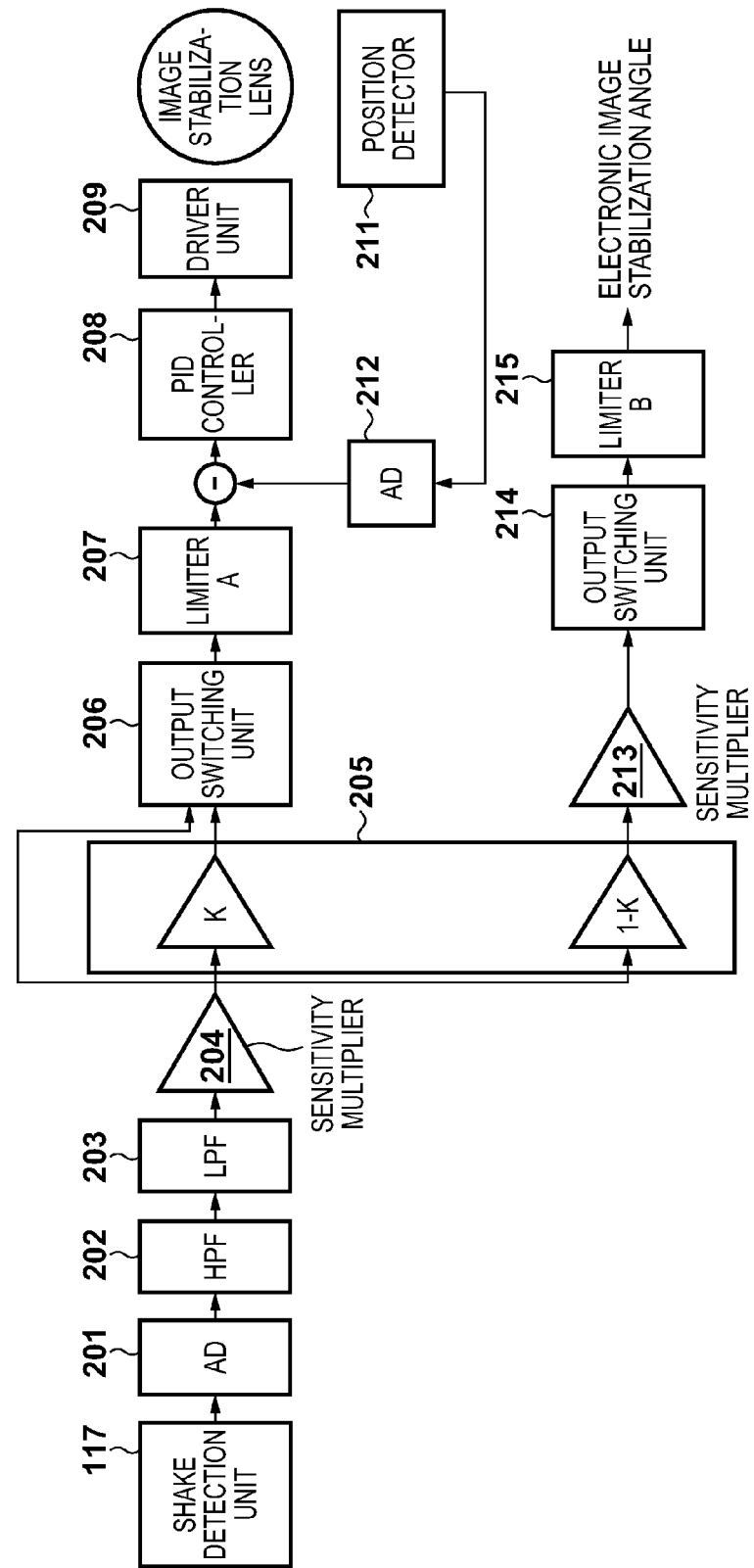
FIG. 2 is a block diagram showing an image stabilization control unit.

FIG. 2 is a block diagram for explaining in more detail the image stabilization control unit 106. The image stabilization control unit 106 has the same arrangement in both the pitch and yaw directions, so an arrangement for only one axis will be explained.

The shake detection unit 117 detects a shake by mainly using a gyrosensor, and outputs angular velocity data as a shake detection signal. An A/D converter 201 converts the data output from the shake detection unit 117 into digital data.

A high-pass filter 202 removes a gyro-offset component and temperature drift component. A low-pass filter 203 integrates angular velocity data, thereby converting it into angle data. An optical image stabilization sensitivity multiplier 204 (correction amount calculation unit) converts the angle data into the shift amount (driving target position) of the image stabilization lens. Since the sensitivity changes depending on the focal length, the optical image stabilization sensitivity multiplier 204 multiplies a different sensitivity for a focal length at that time. The image stabilization amount division unit 205 divides the image stabilization amount at K: 1−K (0<K<1). An image stabilization amount division unit 205 multiplies the image stabilization amount by K to calculate an image stabilization amount for optical image stabilization (first image stabilization). The image stabilization amount division unit 205 multiplies the image stabilization amount by 1−K to calculate an image stabilization amount for electronic image stabilization (second image stabilization).

An optical image stabilization output switching unit 206 switches the image stabilization amount between moving image shooting and still image shooting (including still image shooting during moving image shooting). The optical image stabilization output switching unit 206 outputs an image stabilization amount for optical image stabilization (first image stabilization) in still image shooting. An optical image stabilization amount limiter A 207 clamps the image stabilization amount in the correctable range (image stabilization lens movable range or controllable range) of optical image stabilization. That is, the optical image stabilization amount limiter A 207 outputs an image stabilization amount for optical image stabilization by using the range capable of optical image stabilization as an upper limit. This can prevent a situation in which the image stabilization lens hits against the end of the correctable range of optical image stabilization. When the image stabilization lens hits against the end of the correctable range of optical image stabilization, no image stabilization can be performed, the image stabilization effect is lowered, and the appearance of video becomes poor.

A PID controller 208 is a controller for controlling the position of the image stabilization lens. A driver unit 209 converts an image stabilization amount into a voltage and supplies a current for driving. A position detector 211 detects the position of the image stabilization lens in the image stabilization unit 105, and outputs it as a voltage. An A/D converter 212 converts an analog voltage representing the position of the image stabilization lens into digital data (position detection data).

A sensitivity multiplier 213 converts an image stabilization amount (shift amount serving as an optical image stabilization amount) for electronic image stabilization (second image stabilization) into a readout pixel amount serving as an electronic image stabilization amount. An electronic image stabilization output switching unit 214 switches the image stabilization amount between moving image shooting and still image shooting during moving image shooting. The electronic image stabilization output switching unit 214 outputs an image stabilization amount for optical image stabilization (first image stabilization) and electronic image stabilization (second image stabilization) in moving image shooting. An electronic image stabilization amount limiter B 215 clamps the image stabilization amount for electronic image stabilization (second image stabilization) in the range capable of electronic image stabilization. That is, the electronic image stabilization amount limiter B 215 outputs an image stabilization amount for electronic image stabilization by using the range capable of electronic image stabilization as an upper limit.

Figure 3:
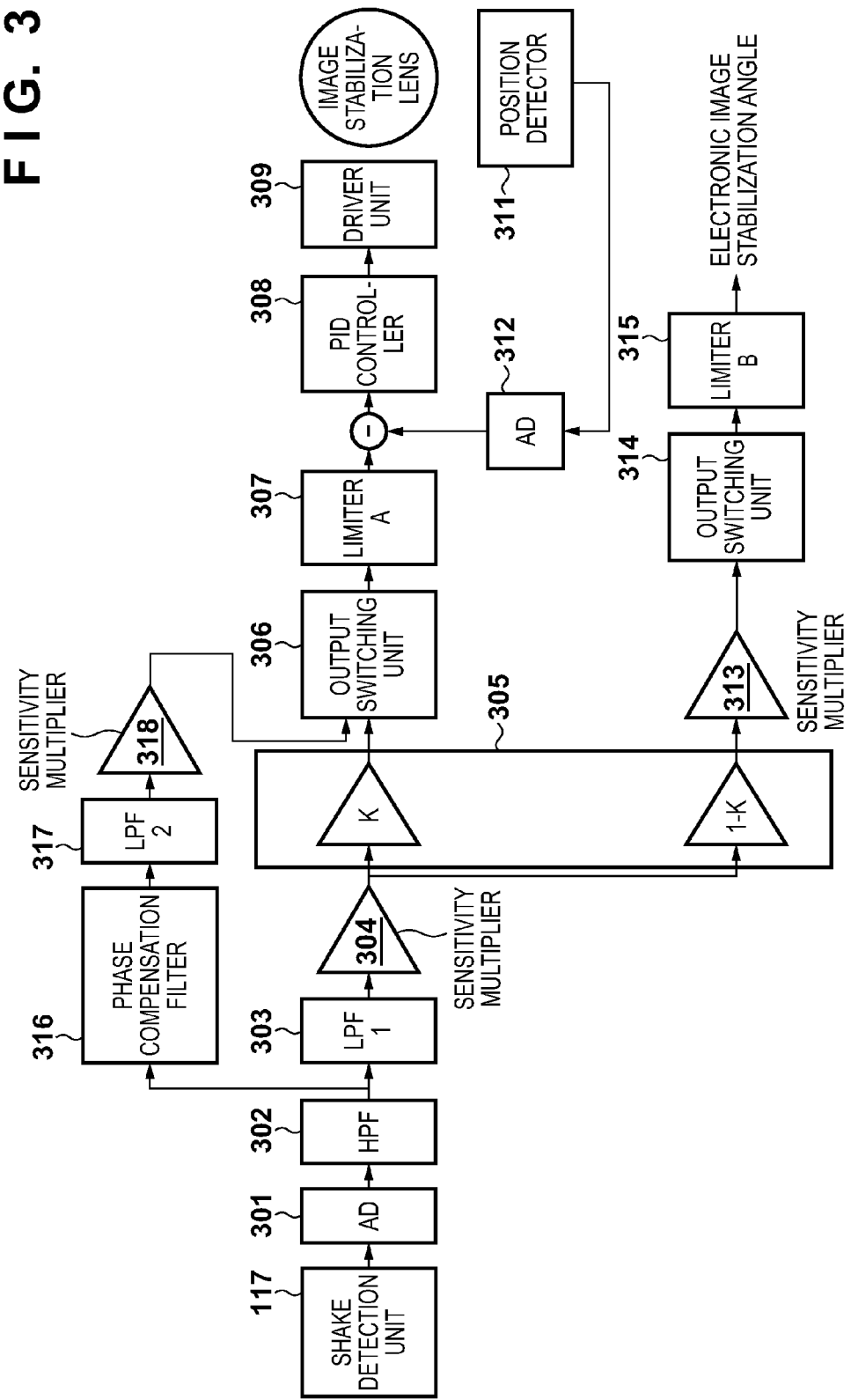
FIG. 3 is a block diagram showing another example of the image stabilization control unit.

FIG. 3 shows an arrangement for obtaining a greater image stabilization effect in still image shooting during moving image shooting though the calculation load of the CPU and the program volume become larger than those in the arrangement of FIG. 2. In the description of FIG. 3, only a difference from FIG. 2 will be explained.

A phase compensation filter 316 widens the frequency band of a shake to undergo image stabilization control by compensating for the phase of an output from a high-pass filter 302. A second low-pass filter 317 integrates angular velocity data serving as a shake detection signal output from the shake detection unit 117, thereby converting the angular velocity data into angle data. A sensitivity multiplier 318 converts the angle data into a shift amount of the image stabilization lens. The path of the phase compensation filter 316, low-pass filter 317, and sensitivity multiplier 318 forms a calculation unit which calculates the image stabilization amount during still image exposure. On standby for moving image shooting or still image shooting, an output from the path of the phase compensation filter 316, low-pass filter 317, and sensitivity multiplier 318 is not used. This is because the frequency band of a shake to undergo image stabilization control is wide.

When the frequency band of a shake to undergo image stabilization control is wide, a shake in the low frequency band upon panning or the like is corrected. However, if the frequency band of a shake to undergo image stabilization control is widened in a situation in which an operation such as panning readily occurs as on standby for moving image shooting or still image shooting, the correction member and the image output range of the electronic image stabilization range readily reach the end of the correctable range. Therefore, the correction member and the image output range of the electronic image stabilization range are prevented from reaching the image output range of the electronic image stabilization range, not to lower the image stabilization effect and deteriorate the appearance of video.

Figure 4:
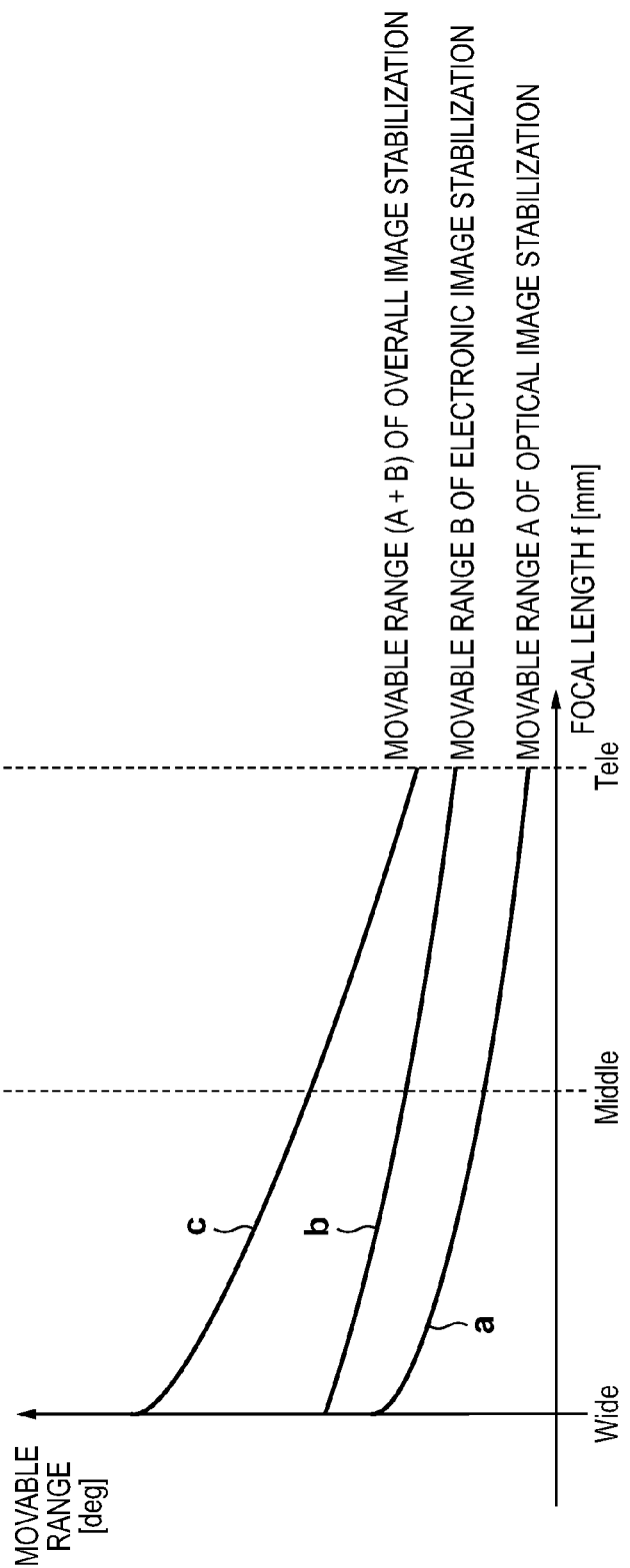
FIG. 4 is a graph showing the relationship between the focal length and the image stabilization range.

FIG. 4 is a graph showing the relationship between the focal length of the camera and the movable range of image stabilization. In FIG. 4, the abscissa represents the focal length, and the ordinate represents the movable range. In FIG. 4, (a) is the movable range of optical image stabilization, (b) is the movable range of electronic image stabilization, and (c) is the movable range of overall image stabilization. That is, (a)+(b)=(c).

The movable range A of optical image stabilization is determined by the optical characteristics of the lens. The movable range B of electronic image stabilization is determined by the excessive pixels of the image pickup device. Note that the correction angle (degree of deflection of the optical axis for correcting movement of an image caused by a shake) changes upon zooming for both the movable range A of optical image stabilization and the movable range B of electronic image stabilization. More specifically, even when the same shake acts on the camera, the amount for driving the image stabilization lens of the image stabilization unit 105 to correct an image blur generated by a shake changes depending on the zoom position (optical zoom magnification and focal length). Even if the same 1-deg shake acts on the camera, the amount by which the image stabilization unit 105 moves at the Wide end to correct an image blur generated by the 1-deg shake is smaller than the amount by which the image stabilization unit 105 moves at the Tele end.

Figure 5:
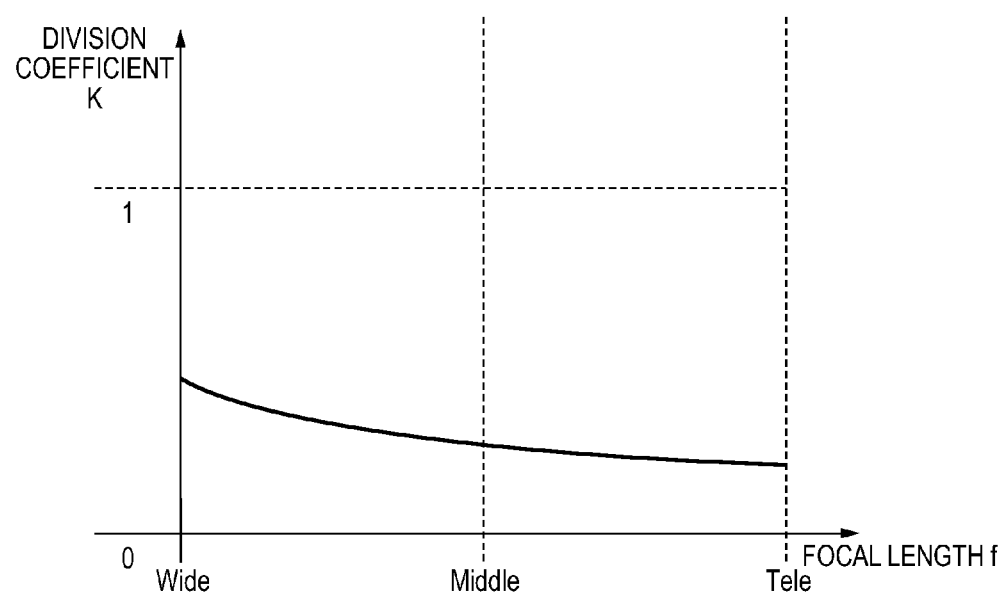
FIG. 5 is a graph showing the relationship between the focal length and a division coefficient K.

FIG. 5 is a graph showing the relationship between the focal length and a division coefficient K. The division coefficient K is determined based on the correctable range A of optical image stabilization and the correctable range B of electronic image stabilization described above:

$$K=A/(A+B) \qquad (1)$$

When the focal length is plotted along the abscissa and the division coefficient K is plotted along the ordinate, K always takes a value of 1 or smaller, as shown in FIG. 5.

According to equation (1), image disturbance caused by an overshoot of optical image stabilization is suppressed. This will be explained in detail in cases in which the camera is at the Wide end, Middle position, and Tele end, as shown in FIG. 5.

When the image stabilization lens of the image stabilization unit 105 moves in the correctable range A of optical image stabilization and the image readout range (image output range) of electronic image stabilization moves in the correctable range B, an image blur up to an image blur corresponding to a parenthesized shake angle can be corrected. Assuming that the correctable range A of optical image stabilization is (2 deg, 0.75 deg, 0.3 deg) at Wide, Middle, and Tele, respectively, and the correctable range B of electronic image stabilization is (2.5 deg, 1.6 deg, 1.1 deg) at Wide, Middle, and Tele, respectively, the division coefficient K becomes (0.444, 0.319, 0.214) at Wide, Middle, and Tele.

Next, optical image stabilization control and electronic image stabilization control upon panning will be explained with reference to FIGS. 6 and 7.

Figure 6:
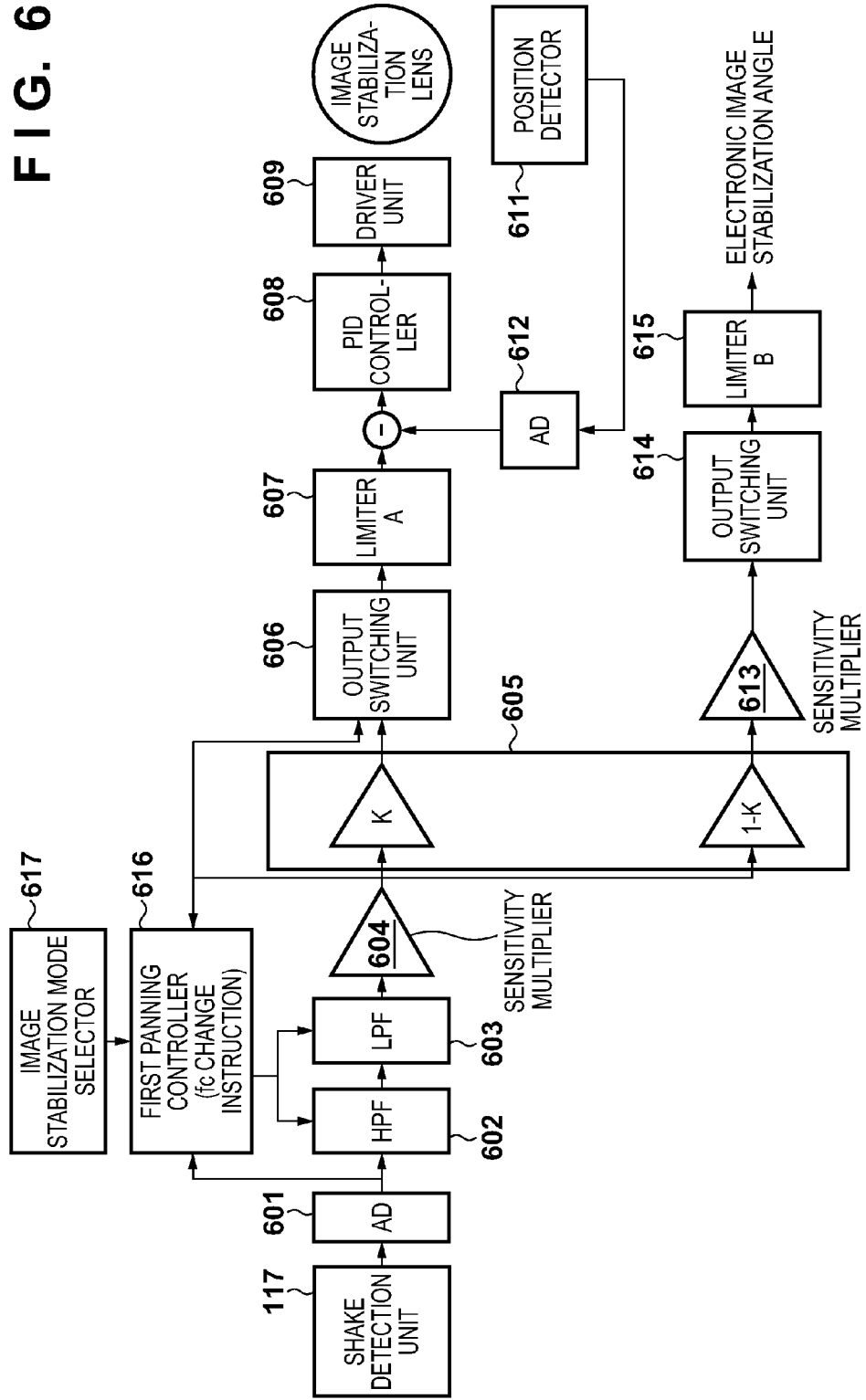
FIG. 6 is a block diagram showing details of a first panning controller.

A difference between FIGS. 6 and 2 is a first panning controller 616 which receives an output (output from the A/D converter 201) obtained by A/D-converting a shake detection signal, and an image stabilization amount (output from the optical image stabilization sensitivity multiplier 204) multiplied by a sensitivity. The first panning controller 616 changes the cutoff frequencies of the high-pass filter 202 and low-pass filter 203 of the image stabilization control unit 106. An image stabilization mode selector 617 can select the mode using only optical image stabilization or the mode using both optical image stabilization and electronic image stabilization. Basically, as an output (output from the A/D converter 201) obtained by A/D-converting a shake signal is larger, the first panning controller 616 increases the cutoff frequencies of the high-pass filter 202 and low-pass filter 203. Also, as the image stabilization amount (output from the optical image stabilization sensitivity multiplier 204) is larger, the first panning controller 616 increases the cutoff frequencies of the high-pass filter 202 and low-pass filter 203. This attenuates the image stabilization amount, prevents sticking of the correction member and the image output range of the electronic image stabilization range to the image stabilization control end, and advances return to image stabilization after panning.

In the image stabilization mode using both optical image stabilization and electronic image stabilization, the range capable of image stabilization becomes wider than that in the image stabilization mode using only optical image stabilization. For this reason, in the image stabilization mode using both optical image stabilization and electronic image stabilization, the rate of rise of the cutoff frequency upon panning is lowered, compared to the image stabilization mode using only optical image stabilization.

Figure 7:
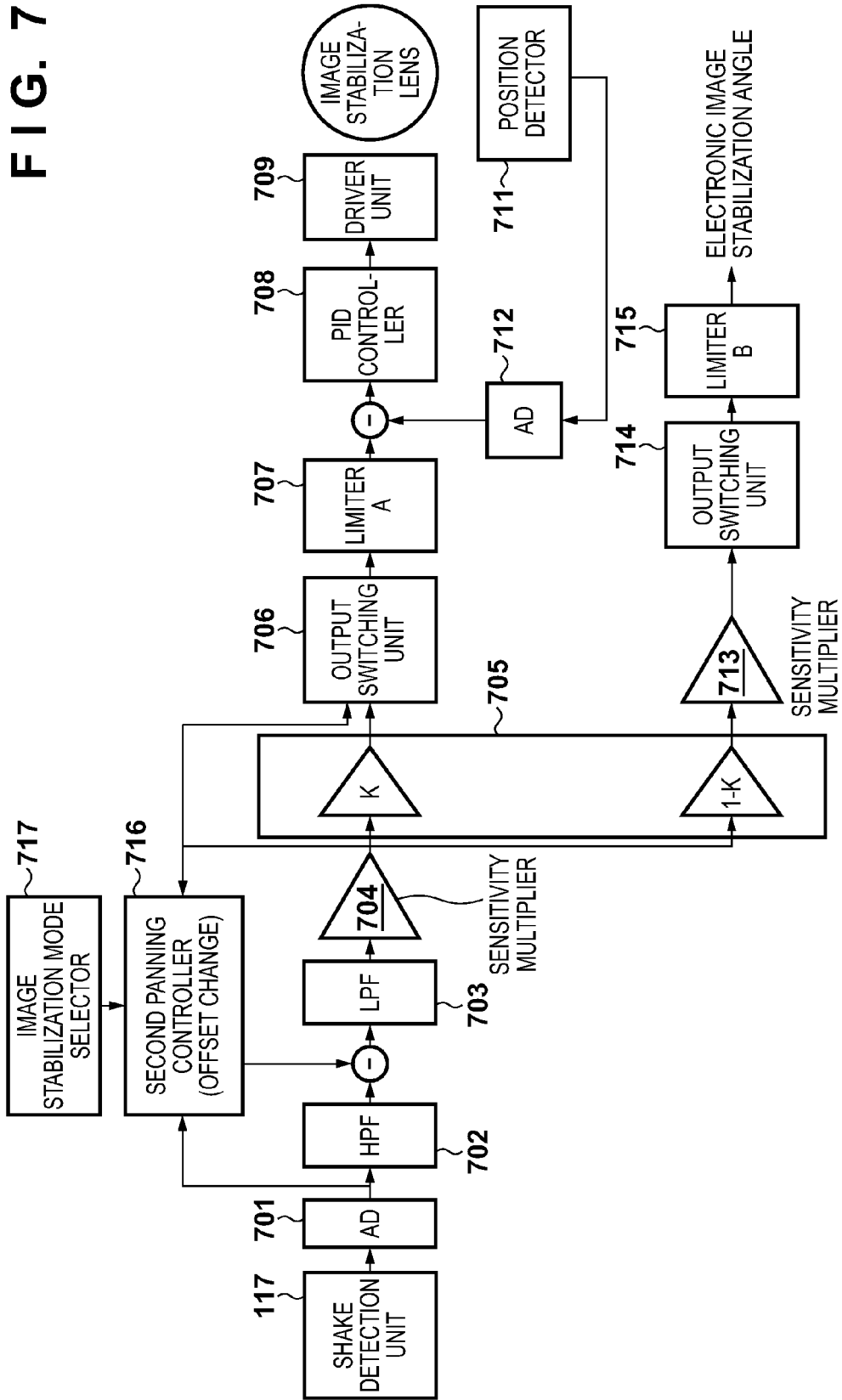
FIG. 7 is a block diagram showing details of a second panning controller.

A difference between FIGS. 7 and 2 is a second panning controller 716 which receives an output obtained by A/D-converting a shake signal, and an image stabilization amount multiplied by a sensitivity. An output from the second panning controller 716 is an offset value to be subtracted from a shake signal. An image stabilization mode selector 717 can select the mode using only optical image stabilization or the mode using both optical image stabilization and electronic image stabilization. Basically, the offset value becomes larger as the shake signal becomes larger, and also becomes larger as the image stabilization amount becomes larger. This attenuates the image stabilization amount, prevents sticking to the image stabilization control end, and advances return to image stabilization after panning.

In the image stabilization mode using both optical image stabilization and electronic image stabilization, the image stabilization range becomes wider than that in the mode using only optical image stabilization, so the offset value is decreased even for the same image stabilization signal and image stabilization amount. For example, in the image stabilization mode using both optical image stabilization and electronic image stabilization, when the entire correction range is double wider than the movable range in only optical image stabilization, an offset value to be subtracted from a shake signal upon panning is decreased to ½ of an offset value used in only optical image stabilization.

Figure 8:
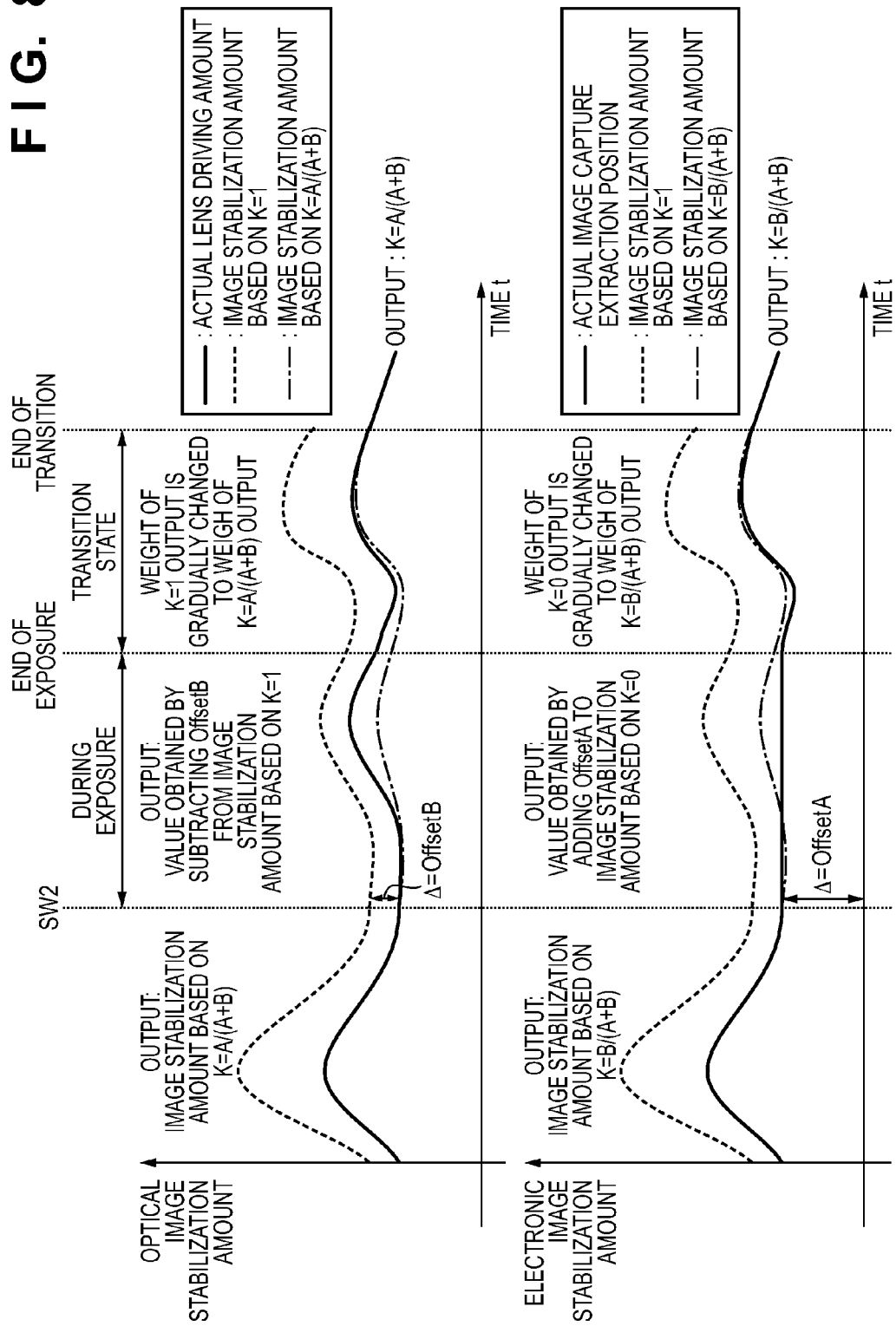
FIG. 8 is a graph showing switching of the image stabilization amount in still image shooting during moving image shooting.

Next, a still image shooting process while both optical image stabilization and electronic image stabilization are used will be explained with reference to FIG. 8. It is to be understood that the below described still image shooting while both optical image stabilization and electronic stabilization are used can be performed by any of the image stabilization arrangements that have been described above with reference to FIG. 2, 3, 6 or 7. In FIG. 8, the upper graph is a time-series graph of the optical image stabilization amount, at the lower graph is a time-series graph of the electronic image stabilization amount.

During an operation except for still image exposure (i.e. during moving image recording), in optical image stabilization, the lens is driven by an image stabilization amount for optical image stabilization (first image stabilization) that is obtained by multiplying the image stabilization amount by $K=A/(A+B)$. In contrast, in electronic image stabilization, the image readout position is changed by an image stabilization amount for electronic image stabilization (second image stabilization) that is obtained by multiplying the image stabilization amount by $K=B/(A+B)$. When SW2 is pressed to start a still image exposure, the image stabilization amount is calculated using $K=1$ in order to perform optical image stabilization. In addition, OffsetB (that is, an electronic image stabilization amount at the time when still image shooting is instructed which is a value obtained by subtracting an image stabilization amount based on $K=A/(A+B)$ from an image stabilization amount based on $K=1$ is held (i.e. in a memory) so that optical image stabilization can be performed continuously from an immediately preceding lens position. Therefore, OffsetB is an electronic image stabilization amount obtained when still image shooting was instructed during moving image recording. During the exposure period, optical image stabilization is performed using a value obtained by always subtracting OffsetB from an image stabilization amount based on $K=$(first switching). In other words, an optical image stabilization amount is obtained by subtracting an electronic image stabilization amount obtained when the still image shooting operation was instructed (OffsetB) from the optical image stabilization amount calculated during the still image exposure period (image stabilization amount based on K=1).

In contrast, in electronic image stabilization, OffsetA serving as an image stabilization amount based on K=B/(A+B) (that is, an electronic image stabilization amount at the time of instructing still image shooting) from an image stabilization amount based on K=0 for SW2 is held (e.g. in a memory). During the exposure period, a value obtained by adding OffsetA to an image stabilization amount based on K=0 is set as the image readout position, and an image is output (second switching).

After the end of exposure, the image stabilization amount division unit 205 gradually switches (i.e. changes) the division coefficient K from K=1 to K=A/(A+B). As a result, the optical image stabilization amount is gradually switched (changed) from an image stabilization amount to a value obtained by multiplying the image stabilization amount by K=A/(A+B). Even in electronic image stabilization, the image stabilization amount is 0 at the end of exposure and is gradually switched (changed) to a value obtained by multiplying the image stabilization amount by K=B/(A+B).

Letting S be an image stabilization amount based on K=1 and C (for example, 0≤C≤100) be a transition counter for gradually switching (changing) the image stabilization amount, an optical image stabilization amount $S_O$ and electronic image stabilization amount $S_e$ during transition are given by:

$$S_O = (S - \text{Offset}B) \times (100-C)/100 + K \times S \times C/100$$

$$S_e = \text{Offset}A \times (100-C)/100 + (1-K) \times S \times C/100$$

(where C counts from 0 to 100)      (2)

After the transition counter C reaches a maximum value, image stabilization is performed by optical image stabilization using a value obtained by multiplying the image stabilization amount by the division coefficient K=A/(A+B). In electronic image stabilization, the image readout position is changed using a value obtained by multiplying the image stabilization amount by the division coefficient K=B/(A+B), and image stabilization is performed.

Next, details of processing will be explained with reference to the flowchart of FIG. 9. This flowchart is repetitively processed by predetermined control sampling after the camera is activated.

In step S901, it is checked which of only optical image stabilization, and both optical image stabilization and electronic image stabilization are used in the image stabilization mode. If the image stabilization mode uses only optical image stabilization, the image stabilization amount division coefficient K is forcibly set to 1 in step S902.

In step S903, a panning control parameter is changed for only optical image stabilization. That is, the image stabilization amount division unit 205 substitutes (sets) the division coefficient K=1. In step S904, an image stabilization amount S (calculation result obtained by multiplying the image stabilization amount S by the division coefficient K=1) is substituted into (set as) the optical image stabilization amount $S_O$, and 0 (in practice, a calculation result obtained by multiplying the image stabilization amount S by 1−K=0) is substituted into (set as) the electronic image stabilization amount $S_e$.

If the image stabilization mode uses both optical image stabilization and electronic image stabilization in step S901, the image stabilization amount division unit 205 calculates the division coefficient K=A/(A+B) in step S905. In step S906, the first panning controller 616 changes the panning control parameter. In step S907, it is determined whether still image exposure is in progress. If still image exposure is not in progress (NO in step S907), a transition flag is determined in step S908. If FALSE in step S908, that is, neither still image exposure nor transition is in progress, S×K is set as the optical image stabilization amount $S_O$, and S×(1−K) is set as the electronic image stabilization amount $S_e$.

If still image exposure is in progress (YES in step S907), OffsetA and OffsetB at that instant are held in the memory, and the transition flag is changed to TRUE in step S910. As image stabilization amounts during still image exposure, $S_O = S - \text{Offset}B$ and $S_e = \text{Offset}A$ are set.

If still image exposure ends and it is determined in step S907 that still image exposure is not in progress, TRUE is set in the transition flag immediately after the end of still image exposure. In step S911, therefore, the transition counter C is incremented. In FIG. 9, for example, the transition counter takes a numerical value of 0 to 100, but the maximum numerical value is arbitrary.

Then, in step S912, the image stabilization amounts are set. The image stabilization amounts at this time are given by equations (2). In step S913, it is determined whether the transition counter has reached the maximum value. If the transition counter has not reached the maximum value, the process ends and returns to step S901.

If it is determined in step S913 that the transition counter has reached the maximum value, the transition flag is changed to FALSE, the transition counter is initialized to 0, and the process returns to step S901. If C=100 (maximum value), the optical image stabilization amount $S_O$ becomes K×S from the result of step S912, and the electronic image stabilization amount $S_e$ becomes (1−K)×S, which are continuously connected to the calculation results in steps S909.

As described above, a digital camera for shooting still images and moving images has been exemplified as the image capture apparatus according to the embodiment of the present invention. However, the image capture apparatus may be an electronic device equipped with the image capture apparatus, such as a mobile phone, smartphone, tablet device, or game device.

The present invention may also be embodied by programs which, when run on a computer or processor, cause the computer or processor to carry out any of the methods described above or which, when loaded into a programmable apparatus, cause that apparatus to become any of the apparatuses described above. The program may be provided by itself, or carried by a carrier medium. The carrier medium may be a storage or recording medium, or it may be a transmission medium such as a signal. A program embodying the present invention may be transitory or non-transitory.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2013-055419, filed Mar. 18, 2013, which is hereby incorporated by reference herein in its entirety.

What is claimed is:

1. An image capture apparatus comprising:
an image pickup device which photo-electrically converts an object image formed by an imaging optical system;

a first image optical stabilizer configured to optically correct an image blur by driving part of the imaging optical system in a direction in which a blur of the object image is corrected;

a second image stabilization electronic processor configured to electronically correct the image blur by controlling an image readout position of said image pickup device in the direction in which the blur of the object image is corrected;

a shake detector configured to detect a shake of the image capture apparatus to output a shake signal;

an optical image stabilization sensitivity multiplier configured to calculate an image stabilization amount based on the shake signal detected by said shake detector; and a divider configured to divide a first image stabilization amount of a predetermined frequency band calculated by said optical image stabilization sensitivity multiplier into a second image stabilization amount for correcting the image blur by said first image optical stabilizer and a third image stabilization amount for correcting the image blur by said second image stabilization electronic processor, wherein while still image exposure is performed upon instructing a still image shooting operation during moving image recording, said first image optical stabilizer optically corrects the image blur by using a correction amount obtained by subtracting the third image stabilization amount obtained when the still image shooting operation was instructed, from the first image stabilization amount calculated during a still image exposure period.

2. The apparatus according to claim 1, wherein while still image exposure is performed upon instructing the still image shooting operation during moving image recording, said second image stabilization electronic processor is held at an image readout position of said image pickup device that is calculated using the third image stabilization amount obtained when the still image shooting operation was instructed.

3. The apparatus according to claim 1, wherein
said divider divides the first image stabilization amount into the second image stabilization amount and the third image stabilization amount such that a ratio between the second image stabilization amount and the third image stabilization amount is equal to K/(1−K), and letting A be a movable range of said first image optical stabilizer and B be a movable range of said second image electronic processor, division coefficient K=A/(A +B)

is satisfied and K changes depending on a focal length.

4. The apparatus according to claim 3, wherein the division coefficient K takes a value larger on wide-angle side than on telephoto side.

5. The apparatus according to claim 1, further comprising:
a mode selection switch configured to select a mode in which image stabilization is performed by only said first image optical stabilizer, and a mode in which image stabilization is performed by both said first image optical stabilizer and said second image electronic processor; and a panning controller configured to subtract a predetermined offset value from the shake signal input to said optical image stabilization sensitivity multiplier based on the shake signal and the first image stabilization amount, wherein in the mode using both said first image optical stabilizer and said second image electronic processor, the offset value is decreased, compared to the mode using only said first image optical stabilizer.

6. A method of controlling an image capture apparatus including an image pickup device which photo-electrically converts an object image formed by an imaging optical system, comprising:

a first image stabilization step of optically correcting an image blur by driving part of the imaging optical system in a direction in which a blur of the object image is corrected;

a second image stabilization step of electronically correcting the image blur by controlling an image readout position of the image pickup device in the direction in which the blur of the object image is corrected;

a shake detection step of detecting a shake of the image capture apparatus to output a shake signal;

a correction amount calculation step of calculating an image stabilization amount based on the shake signal detected in the shake detection step; and a division step of dividing a first image stabilization amount of a predetermined frequency band calculated in the correction amount calculation step into a second image stabilization amount for correcting the image blur in the first image stabilization step and a third image stabilization amount for correcting the image blur in the second image stabilization step, wherein while still image exposure is performed upon instructing a still image shooting operation during moving image recording, the image blur is optically corrected in the first image stabilization step by using a correction amount obtained by subtracting the third image stabilization amount obtained when the still image shooting operation was instructed, from the first image stabilization amount calculated during a still image exposure period.

7. An image processing apparatus comprising:
an optical image stabilization sensitivity multiplier configured to calculate an image stabilization amount based on a shake signal which represents a shake of an image capture apparatus and is detected by a shake detector; and a divider configured to divide a first image stabilization amount of a predetermined frequency band calculated by said optical image stabilization sensitivity multiplier into a second image stabilization amount for correcting an image blur by a first image optical stabilizer that optically correct an image blur by driving part of an imaging optical system in a direction in which a blur of the object image is corrected and a third image stabilization amount for correcting the image blur by a second image stabilization electronic processor that electronically correct the image blur by controlling an image readout position of an image pickup device in a direction in which the blur of the object image is corrected; and a controller configured to control the first image optical stabilizer and the second image stabilization electronic processor such that, while still image exposure is performed upon instructing a still image shooting operation during moving image recording, the first image optical stabilizer optically corrects the image blur by using a correction amount obtained by subtracting the third image stabilization amount obtained when the still image shooting operation was instructed, from the first image stabilization amount calculated during a still image exposure period.

8. The apparatus according to claim 7, wherein while still image exposure is performed upon instructing the still image shooting operation during moving image recording, the second image stabilization electronic processor is held at an image readout position of the image pickup device that is calculated using the third image stabilization amount obtained when the still image shooting operation was instructed.

9. The apparatus according to claim 7, wherein
said divider divides the first image stabilization amount into the second image stabilization amount and the third image stabilization amount such that a ratio between the second image stabilization amount and the third image stabilization amount is equal to $K/(1-K)$, and
letting A be a movable range of the first image optical stabilizer and B be a movable range of the second image stabilization electronic processor,
division coefficient $K=A/(A+B)$
is satisfied and K changes depending on a focal length.

10. The apparatus according to claim 9, wherein the division coefficient K takes a value larger on wide-angle side than on telephoto side.

11. The apparatus according to claim 7, further comprising:
a mode selection switch configured to select a mode in which image stabilization is performed by only the first image optical stabilizer, and a mode in which image stabilization is performed by both the first image optical stabilizer and the second image stabilization electronic processor; and
a panning controller configured to subtract a predetermined offset value from the shake signal input to said optical image stabilization sensitivity multiplier based on the shake signal and the first image stabilization amount,
wherein in the mode using both the first image optical stabilizer and the second image stabilization electronic processor, the offset value is decreased, compared to the mode using only the first image optical stabilizer.

12. A method of controlling an image processing apparatus, comprising:
a first image stabilization step of optically correcting an image blur by driving part of an imaging optical system in a direction in which a blur of an object image is corrected;
a second image stabilization step of electronically correcting the image blur by controlling an image readout position of an image pickup device in the direction in which the blur of the object image is corrected;
a shake detection step of detecting a shake of the image capture apparatus to output a shake signal;
a correction amount calculation step of calculating an image stabilization amount based on the shake signal detected in the shake detection step; and
a division step of dividing a first image stabilization amount of a predetermined frequency band calculated in the correction amount calculation step into a second image stabilization amount for correcting the image blur in the first image stabilization step and a third image stabilization amount for correcting the image blur in the second image stabilization step,
wherein while still image exposure is performed upon instructing a still image shooting operation during moving image recording, the image blur is optically corrected in the first image stabilization step by using a correction amount obtained by subtracting the third image stabilization amount obtained when the still image shooting operation was instructed, from the first image stabilization amount calculated during a still image exposure period.

* * * * *